Patented Oct. 30, 1934

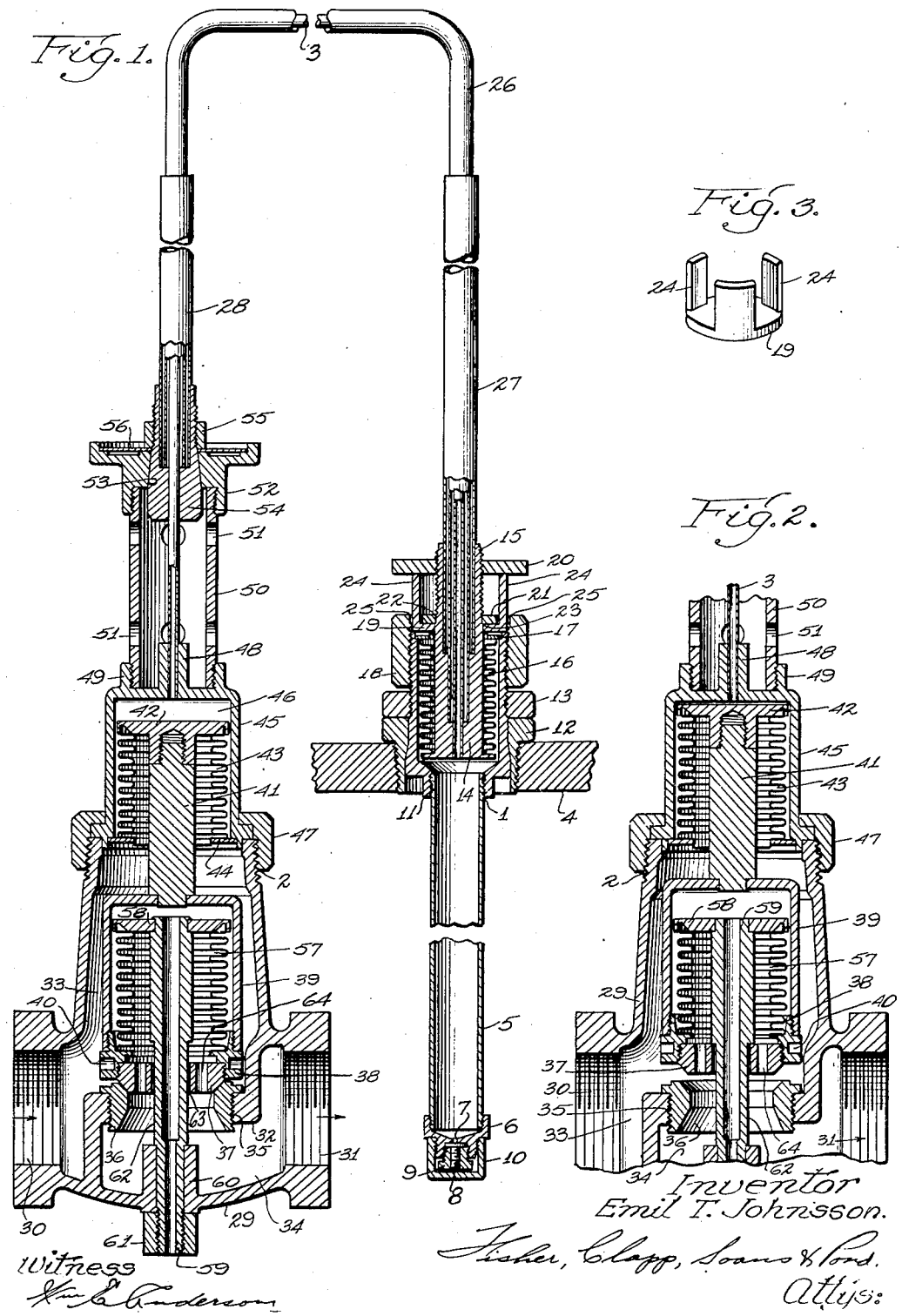

1,979,109

UNITED STATES PATENT OFFICE 1,979,109

VALVE

Emil T. Johnsson, Chicago, Ill.

Application August 15, 1932, Serial No. 628,871

31 Claims. (Cl. 236—99)

This invention relates to thermostatically controlled valves and more particularly to those of the single-seated balanced type.

Apparatuses of this type have a large number of different uses. They may be employed for controlling room temperatures, or for controlling the temperature of liquids as, for instance, in the dairy industry where it is necessary to maintain the milk at a certain temperature for pasteurization.

In such devices, the thermostat is located in the medium to be controlled and it contains a volatile liquid adapted to be vaporized for actuating a bellows which is operatively connected to the valve throttle.

In one type of apparatus heretofore in common use, the volatile liquid in the apparatus was vaporized within the thermostat and the vapor then was conveyed to the valve body for actuating the throttle. Such devices are objectionable because they are not sufficiently sensitive to temperature changes.

The main objects of this invention are to provide a valve having improved balancing means adapted to render the valve extremely sensitive to changes in the pressure of the vapor and, consequently, sensitive to changes in the temperature of the medium in which the thermostat is located; to provide a balanced valve having improved means for guiding the throttle toward and away from its seat; to provide an improved form of thermostat; to provide an improved form of conductor for conducting volatile liquid from the thermostat to the valve body to be flashed into vapor; to provide improved means for attaching said conductor to the valve body and to the thermostat; to provide an improved form of condenser; to provide improved means for vaporizing the volatile liquid at the valve body; to provide improved means for supporting the thermostat; and to provide improved manually operable mechanism for varying the capacity of the thermostat.

An illustrative embodiment of this invention is shown in the accompanying drawing, wherein:

Figure 1 is an axial section of the valve and thermostat; the connecting conductor being shown in elevation and partly broken away; and the valve throttle being shown in closed position.

Fig. 2 is a fragmentary axial section of the valve, showing the throttle in open position.

Fig. 3 is a perspective of the nut lock which is used on the thermostat.

In the construction illustrated, the improved apparatus comprises a thermostat 1 and a balanced valve 2 connected together by a slender tube 3 adapted to conduct a volatile liquid to the the valve to be flashed into vapor for closing the valve.

In the particular form shown, the thermostat is connected to a tank 4 containing the milk or other liquid, the temperature of which is to be controlled. If the liquid is heated by means of a water jacket, the thermostat may be connected to the water jacket.

The improved thermostat includes a tubular container 5, having a fitting 6 at one end provided with an inlet opening 7 through which the thermostat is filled with the volatile liquid. The opening 7 is closed by a plug 8 which is held in place by a screw 9 embracing the stem of the plug. If desired, the plug may be faced with solder. Enclosing the screw 9 is a cap 10 which is threaded on the fitting 6.

The opposite end of the tubular container 5 is threaded to a cylindrical member 11 forming a continuation of the container. The outer surface of the member 11 is tapered adjacent the lower end thereof to form a seat for a rotatable union coupling 12, which is externally threaded for attachment to the tank 4 or other support. With this improved means of attachment, the thermostat may be quickly mounted and removed without the necessity of rotating the entire unit. After the coupling 12 has been secured to the tank, the thermostat is clamped thereto by means of a lock nut 13, which is threaded on the member 11 for frictional engagement with the coupling.

In order to permit the necessary adjustment of the thermostat, it is essential to provide means for varying the capacity of the container 5—11. This is accomplished by means of a plunger 14, which is mounted within the member 11, and which has a threaded stem 15 projecting beyond the outer end of the member 11. To prevent the escape of any of the volatile liquid, this end of the container is sealed by a bellows 16 housed within the member 11 and embracing the plungers. The inner end of this bellows is secured to the plunger and the outer end thereof is provided with a ring 17 which is soldered or otherwise rigidly secured to the rim of the member 11.

The plunger 14 is axially moved by improved manually operable means which comprises a nut 18, spacer 19 and nut 20. The nut 18 is threaded on the externally threaded surface of the member 11 and is provided with an end wall 21, having a central unthreaded aperture 22 for receiving the stem 15 of the plunger. This wall 21 abuts against an annular shoulder 23 formed on the plunger so that, when the nut 18 is screwed inwardly on the member 11, the wall 21 and shoulder 23 coact for moving the plunger 14 inwardly, thereby reducing the capacity of the thermostat.

The spacer 19 is constantly seated on the rim of the member 11. It has a central unthreaded aperture for receiving the stem 15 and it has three prongs 24 which project outwardly through arcuate slots 25 in the wall 21 of the nut 18. With this construction, the member 19 serves as a nut lock, for securing the nut 18 against rotation when the nut 20 is tightened, and it also serves as a spacer and bearing for the nut 20.

The nut 20 is threaded on the stem 15 and bears against the extremities of the prongs 24 so that by tightening the nut, i. e., by rotating it against the prongs 24, the plunger 14 is caused to move outwardly for increasing the capacity of the thermostat. The threads on the nut 20 and stem 15 should be of the same pitch as those on the nut 18 and member 11. However, if the threads on one nut are right hand threads it is preferable to have left hand threads on the nut 20.

The tube 3 is preferably a capillary tube which is enclosed in a flexible metal sleeve 26 to protect it and also to increase its surface area. The ends of the sleeve 26 are housed in flexible metal protecting sleeves 27, 28.

One end of the tube 3 extends axially through the plunger 14 for communication with the thermostat. The plunger 14 is also counter bored to receive the sleeves 26, 27. The tubes 3, 26, and 27 may be soldered to the plunger or secured in any suitable manner. The opposite end of the tube 3 is connected to the valve 2.

In the form shown, the improved valve 2 comprises a casing or body 29 having the usual inlet 30 and outlet 31, between which is located a partition 32 dividing the body into an inlet chamber 33 and an outlet chamber 34. Formed in the partition 32, is a port 35, in which is mounted a valve seat 36 adapted to be closed by a valve throttle 37.

The throttle 37 is threaded in an annular member 38, which is supported on the open end of a cup-shaped casing 39. Openings 40 are formed in the rim of the member 38 to permit the application of a spanner wrench.

Secured to the closed end of the casing 39 is a plunger 41 having a head 42 threaded on its outer end. This head 42 forms the closed end of a bellows 43, which is provided at its open end with a ring 44. The ring 44 is soldered or otherwise rigidly secured to a casing 45, which houses the bellows and which defines a vaporizing chamber 46 communicating with the thermostat through the tube 3. The bellows 43 is thus exposed interiorly to the pressure within the valve body, and exteriorly to the vapor pressure in the vaporizing chamber 46. This bellows is adapted to be collapsed by the vapor pressure within the chamber 46 for closing the valve throttle 37 when the temperature of the medium at the thermostat exceeds a predetermined amount.

The open end of the casing 45 is secured to the valve body by a threaded annular coupling 47. The outer end of the casing 45 has a centrally located boss 48 which is apertured to receive the tube 3. Also formed on the outer end of the casing 45 is an annular flange 49, which is internally threaded for attachment to a cylindrical insulator 50 which surrounds the adjacent end of the tube 3. Ports 51 are formed in the insulator 50 to permit the free circulation of air around the adjacent portion of the tube 3. This construction facilitates condensation of the vapor within this portion of the tube 3.

Threaded on the outer end of the insulator 50 is a coupling 52 having a tapered opening 53, through which extends a bushing 54 which firmly embraces the tube 3 and sleeve 28. The bushing is clamped to the coupling 52 by a nut 55, which is threaded on the bushing. A name plate 56 may be secured to the coupling if desired. The primary purpose of this coupling is to serve as a condenser for dissipating the heat at the adjacent portion of the capillary tube.

In order to prevent the pressure within the valve chamber 33 from resisting the opening of the valve throttle, the bellows 43 is made with the same effective area as the valve throttle so that the pressure on the casing 39, and throttle, tending to hold the valve closed, is balanced by the pressure within the bellows 43, tending to open the valve.

In addition to balancing the valve when the throttle is closed, it is necessary to also balance it when the throttle is open, otherwise the pressure within the valve body would resist closing of the throttle. This is accomplished by the use of a second bellows 57 housed within the casing 39.

The open end of the bellows 57 is soldered or otherwise secured to the annular member 38. The closed end of this bellows is secured to a stationary head 58 which is fixed on the inner extremity of a stationary guide post 59. The guide post projects through a boss 60 in the valve body and is secured to the body by a nut 61 threaded on its outer end.

The guide post 59 has a reduced portion 62 which passes through a central opening 63 in the valve throttle whereby the valve throttle is accurately guided so as to be secured against any lateral shifting. The guide post is preferably hollow so as to provide communication between the interior of the casing 39 and the exterior of the valve body. With this construction, the atmospheric pressure within the casing 39 opens the throttle when the vapor pressure in the chamber 46 falls below the predetermined point.

If desired, the two bellows 43—57 may be constructed so that their resiliency will assist in opening the throttle. However, these bellows are preferably constructed so that the resiliency of one, tending to open the valve, will balance the resiliency of the other, tending to close the valve.

If the valve throttle 37 is imperforate, it will act as a piston head and, in that event, the pressure on the valve throttle plus the pressure within the bellows 43, tending to open the valve, will overbalance the pressure on the casing 39, tending to close the valve. For this reason, the throttle is provided with perforations 64 which permit the steam to enter the bellows 57. Inasmuch as the head 58 is fixed, steam pressure against this head can have no effect whatever on the valve throttle.

In operation, the thermostat and tube 3 are filled with a suitable volatile liquid. After the system has been filled, the filler opening is sealed by the plug 8, screw 9 and cap 10.

The valve throttle 37 is normally held in the open position shown in Fig. 2 by means of the atmospheric pressure within the casing 39, thereby permitting the steam or other heating medium to pass through the valve body for heating the tank 4, room, or other location. The inlet chamber 33 is constantly heated, even when the valve is closed, so that the adjacent casing 45 and vaporizing chamber 46 are constantly heated to a temperature which is sufficient to vaporize any of the liquid entering the chamber 46 from the tube 3.

As the temperature at the thermostat container 5 rises, the volatile liquid expands, and when the set temperature has been reached, the expansion of the liquid forces some of the liquid into the vaporizing zone, where it is flashed into vapor. The vapor pressure within the chamber 46 compresses the bellows 43 and forces the plunger 41 inwardly, thereby closing the throttle 37. The pressure within the bellows 43 balances the pressure on the casing 39 so that the throttle is easily and quickly closed by the vapor pressure in the chamber 46.

As the temperature at the thermostat drops, the liquid contracts, thereby relieving the pressure in the chamber 46 and causing condensation in the adjacent portion of the capillary tube. When condensation takes place, a partial vacuum is created in the vaporizing chamber, and the atmospheric pressure in the casing 39 moves the valve throttle away from its seat.

With this improved construction and arrangement of parts, the valve is properly balanced at all times.

Although but one specific embodiment of this invention has been herein shown and described, it will be understood that details of the construction shown may be altered without departing from the spirit of the invention as defined by the following claims:

I claim:

1. In a device of the class described, the combination with a body having a vaporizing chamber adapted to be constantly heated, of a thermostat comprising a container located in contact with the medium to be controlled and adapted to contain a volatile liquid, a manually operable plunger in one end of said container for varying the capacity of said container, the other end of said container having a filler opening therein, and a slender tube connected to said plunger and providing communication between said container and chamber.

2. In a device of the class described, the combination with a body having a vaporizing chamber, of a thermostat comprising a stationary container located in contact with the medium to be controlled and adapted to contain a volatile liquid, a manually operable wall located in one end of said container for varying the capacity of said container, the opposite end of said container having a filler opening therein, a closure for said filler opening, and a slender tube rigidly connected to said wall for conducting liquid to said chamber to be flashed into vapor.

3. In a device of the class described, the combination with a body having a vaporizing chamber, a housing for the medium to be controlled, of a thermostat comprising a container in contact with the medium in said housing and adapted to contain a volatile liquid, a coupling rotatably mounted on said container and threaded to said housing, a manually operable member projecting through one end of said container for varying the capacity of said container, and a slender tube rigidly connected to said member for conducting liquid to said chamber to be flashed into vapor.

4. In a device of the class described, the combination with a body having a vaporizing chamber, of a thermostat comprising a stationary container located in contact with the medium to be controlled and adapted to contain a volatile liquid, a manually operable plunger projecting through one end of said container for varying the capacity of said container, a slender tube rigidly connected to said plunger for conducting liquid to said chamber to be flashed into vapor, a nut threaded on said container and engaging said plunger for moving said plunger in one direction, a nut lock engaging said container and projecting axially through said nut, and means threaded on said plunger and abutting said nut lock for moving said plunger in the opposite direction.

5. In a device of the class described, the combination with a body having a vaporizing chamber, of a thermostat comprising a stationary container located in contact with the medium to be controlled and adapted to contain a volatile liquid, a manually operable plunger projecting through one end of said container for varying the capacity of said container, a slender tube rigidly connected to said plunger for conducting liquid to said chamber to be flashed into vapor, and a flexible metal tubing having one end rigidly connected to said plunger and forming a sleeve around said slender tube, said slender tube and flexible metal tubing being movable with said plunger relative to said container.

6. In a device of the class described, the combination with a body having a vaporizing chamber, of a thermostat comprising a stationary container located in contact with the medium to be controlled and adapted to contain a volatile liquid, a manually operable plunger projecting through one end of said container for varying the capacity of said container, a slender tube rigidly connected to said plunger for conducting liquid to said chamber to be flashed into vapor, a flexible metal tubing forming a sleeve around said slender tube, and other flexible metal tubing embracing said sleeve adjacent the ends thereof, said sleeve and one end of said outer tubing being rigidly connected to said plunger and being movable with said plunger relative to said container.

7. In a device of the class described, the combination of a body having a vaporizing chamber, a thermostat having a container located in contact with the medium to be controlled and adapted to contain a volatile liquid, a slender tube providing communication between said chamber and container for conducting liquid to said chamber to be flashed into vapor, a flexible metal tube forming a sleeve around said slender tube, a bushing mounted on said flexible metal tube, said sleeve and bushing being spaced from said vaporizing chamber, and insulating means for connecting said bushing to said body in order to prevent the transfer of a vaporizing heat from said body to said bushing and sleeve.

8. In a device of the class described, the combination of a body having a vaporizing chamber, a thermostat having a container located in contact with the medium to be controlled and adapted to contain a volatile liquid, a slender tube providing communication between said chamber and container for conducting liquid to said chamber to be flashed into vapor, a bushing surrounding said tube, and a coupling embracing said bushing and having a portion thereof forming a condenser.

9. In a device of the class described, the combination of a body having a vaporizing chamber, a thermostat having a container located in contact with the medium to be controlled and adapted to contain a volatile liquid, a slender tube providing communication between said chamber and container for conducting liquid to said chamber to be flashed into vapor, a sleeve surrounding said tube and spaced from said body, and a spacer connecting said sleeve with said body.

10. In a device of the class described, the combination of a body having a vaporizing chamber, a thermostat having a container located in contact with the medium to be controlled and adapted to contain a volatile liquid, a slender tube providing communication between said chamber and container for conducting liquid to said chamber to be flashed into vapor, a sleeve surrounding said tube and spaced from said body, and an insulator spacer connecting said sleeve with said body.

11. In a device of the class described, the combination of a body having a vaporizing chamber, a thermostat having a container located in contact with the medium to be controlled and adapted to contain a volatile liquid, a slender tube providing communication between said chamber and container for conducting liquid to said chamber to be flashed into vapor, a sleeve surrounding said tube and spaced from said body, a condenser on said sleeve and spaced from said body, and a spacer connecting said condenser with said body.

12. In a device of the class described, a valve body having inlet and outlet openings for a heating fluid, a valve port between said openings, a valve throttle controlling said port, and a pair of bellows connected to said throttle and both located on one side of said port, each of said bellows having an effective diameter equal to the diameter of said port.

13. In a device of the class described, a valve body having inlet and outlet chambers for a heating fluid, a valve port between said chambers, a throttle controlling said port, and a pair of bellows connected to said throttle and both located on one side of said port, each of said bellows having an effective diameter equal to the diameter of said port whereby fluid pressure on said bellows balances the fluid pressure on said throttle, one side of one of said bellows being exposed to the fluid in the chamber on the opposite side of said port when said throttle is closed.

14. In a device of the class described, a valve body having inlet and outlet openings, a valve port within said body, a throttle controlling said port, means for operating said throttle, and balancing means comprising two movable walls of equal effective area connected to said throttle, said means being exposed on one side to fluid pressure within said body and being exposed on the opposite side to atmospheric pressure.

15. In a device of the class described, a valve body having inlet and outlet openings, a valve port within said body, a guide stem rigidly secured to said body, a throttle slidably mounted on said stem and controlling said port, a casing secured to said throttle, means connected to said casing for operating said valve, and balancing means within said casing, one end of said means being connected to said guide stem and its other end being connected to said valve throttle.

16. In a device of the class described, a valve body having inlet and outlet openings, a valve port within said body, a guide stem rigidly secured to said body, a throttle slidably mounted on said stem and controlling said port, a casing secured to said throttle, means connected to said casing for operating said valve, and balancing means within said casing, one end of said means being connected to said guide stem and its other end being connected to said valve throttle, said valve throttle being perforated to permit said means to be exposed on one side to fluid pressure in said body.

17. In a device of the class described, a valve body having inlet and outlet openings, a valve port within said body, a guide stem rigidly secured to said body, a throttle slidably mounted on said stem and controlling said port, a casing secured to said throttle, means connected to said casing for operating said valve, and a balancing bellows within said casing, one end of said bellows being connected to said guide stem and its other end being connected to said valve throttle, said guide stem being hollow to permit communication between said casing and the atmosphere.

18. In a device of the class described, a valve body having a vaporizing chamber, a thermostat having a liquid receptacle located in contact with the medium to be controlled, a tube for conducting liquid from said receptacle to said vaporizing chamber, a valve port within said body, a throttle controlling said port, a casing mounted on said throttle, a bellows having an open end connected to said body and having a closed end connected to said casing, said bellows being exposed on one side to pressure within said body and being exposed on its opposite side to pressure within said vaporizing chamber, a guide stem rigidly secured to said body and extending through said throttle for guiding said throttle and a second bellows housed within said casing, one end of said bellows being connected to said throttle and its other end being connected to said stem, said second bellows being exposed on one side to pressure within said body.

19. In a device of the class described, a valve body having a vaporizing chamber, a thermostat having a liquid receptacle located in contact with the medium to be controlled, a tube for conducting liquid from said receptacle to said vaporizing chamber, a valve port within said body, a throttle controlling said port, a casing mounted on said throttle, a bellows having an open end connected to said body and having a closed end connected to said casing, said bellows being exposed on one side to pressure within said body and being exposed on the opposite side to pressure within said vaporizing chamber, a guide stem rigidly secured to said body and extending through said throttle for guiding said throttle, and a second bellows housed within said casing, one end of said bellows being connected to said throttle and its other end being connected to said stem, said second bellows being exposed on one side to pressure within said body, said stem being hollow to admit air to said casing whereby said second bellows is exposed on its opposite side to atmospheric pressure.

20. In a device of the class described, a body for a heating fluid, a vaporizing chamber on said body adapted to be constantly heated by the fluid in said body, a control member in said body, a bellows operatively connected to said member and arranged to separate said chamber from the interior of said body, a thermostat containing a volatile liquid, a slender tube connected to said thermostat for conducting liquid to said vaporizing chamber to be there flashed into vapor for actuating said bellows to move said control member, a stationary stem in said body for guiding the movement of said control member, and balancing means connected to said stem for balancing the action of said bellows.

21. In a device of the class described, a body for a heating fluid, a vaporizing chamber on said body adapted to be constantly heated by the fluid in said body, a control member in said body, a bellows operatively connected to said member and arranged to separate said chamber from the interior of said body, a thermostat containing a volatile liquid, a slender tube connected to said thermostat for conducting liquid to said vaporizing chamber to be there flashed into vapor for actuating said bellows to move said control member, a stationary stem in said body for guiding the movement of said control member, and a balancing bellows connected to said stem and to said control member.

22. In a device of the class described, a body for a heating fluid, a vaporizing chamber on said body adapted to be constantly heated by the fluid in said body, a control member in said body, a bellows operatively connected to said member and arranged to separate said chamber from the interior of said body, a stationary stem in said body for guiding the movement of said control member, and balancing means connected to said stem for balancing the action of said bellows.

23. In a device of the class described, a valve body having inlet and outlet openings, a valve port within said body, a throttle controlling said port, means for operating said throttle, and balancing means comprising two movable walls of equal effective area connected to said throttle and both located on the same side of said valve port.

24. A body for the passage of a fluid, a valve port in said body, a member controlling said port, a stationary stem in said body for guiding said control member, and balancing means comprising two movable walls of equal effective area both located on the same side of said valve port and connected to said control member.

25. In a device of the class described, the combination with a body having a vaporizing chamber adapted to be constantly heated, of a thermostat comprising a container located in contact with the medium to be controlled and adapted to contain a volatile liquid, a manually operable plunger in one end of said container for varying the capacity of said container, and a slender tube connected to said plunger and providing communication between said container and chamber.

26. In a device of the class described, the combination of a body having a vaporizing chamber, a container of a volatile liquid, a slender tube providing communication between said chamber and container for conducting liquid to said chamber to be flashed into vapor, a flexible metal tube forming a sleeve around said slender tube, a bushing mounted on said flexible metal tube, said sleeve and bushing being spaced from said vaporizing chamber, and insulating means for connecting said bushing to said body in order to prevent the transfer of a vaporizing heat from said body to said bushing and sleeve.

27. In a device of the class described, the combination of a body having a vaporizing chamber, a container of a volatile liquid, a slender tube providing communication between the said chamber and container for conducting liquid to said chamber to be flashed into vapor, a bushing surrounding said tube, and a coupling embracing said bushing and having a portion thereof forming a condenser.

28. In a device of the class described, the combination of a body having a vaporizing chamber, a container of a volatile liquid, a slender tube providing communication between said chamber and container for conducting liquid to said chamber to be flashed into vapor, a sleeve surrounding said tube and spaced from said body, and a spacer connecting said sleeve with said body.

29. In a device of the class described, the combination of a body having a vaporizing chamber, a container of a volatile liquid, a slender tube providing communication between said chamber and container for conducting liquid to said chamber to be flashed into vapor, a sleeve surrounding said tube and spaced from said body, and an insulator spacer connecting said sleeve with said body.

30. In a device of the class described, the combination of a body having a vaporizing chamber, a container of a volatile liquid, a slender tube providing communication between said chamber and container for conducting liquid to said chamber to be flashed into vapor, a sleeve surrounding said tube and spaced from said body, a condenser on said sleeve and spaced from said body, and a spacer connecting said condenser with said body.

31. In a device of the class described, the combination of a body having a vaporizing chamber, a container of a volatile liquid, a slender tube providing communication between said chamber and container for conducting liquid to said chamber to be flashed into vapor, a condenser mounted onto said tube and spaced from said body, and an insulator spacer connecting said condenser with said body.

EMIL T. JOHNSSON.